United States Patent
Atmur

(10) Patent No.: US 10,020,716 B2
(45) Date of Patent: Jul. 10, 2018

(54) TRANSVERSE FLUX INDUCTION MOTOR WITH PASSIVE BRAKING SYSTEM

(71) Applicant: The Boeing Company, Chicago, IL (US)

(72) Inventor: Robert J. Atmur, Whittier, CA (US)

(73) Assignee: The Boeing Company, Chicago, IL (US)

(*) Notice: Subject to any disclaimer, the term of this patent is extended or adjusted under 35 U.S.C. 154(b) by 944 days.

(21) Appl. No.: 14/058,914

(22) Filed: Oct. 21, 2013

(65) Prior Publication Data

US 2014/0183981 A1  Jul. 3, 2014

Related U.S. Application Data

(63) Continuation-in-part of application No. 12/751,823, filed on Mar. 31, 2010.

(51) Int. Cl.
*H02K 41/025* (2006.01)
*H02K 21/44* (2006.01)
*H02K 17/12* (2006.01)
*H02K 17/16* (2006.01)

(52) U.S. Cl.
CPC ............ *H02K 17/12* (2013.01); *H02K 17/16* (2013.01); *H02K 21/44* (2013.01); *H02K 41/025* (2013.01)

(58) Field of Classification Search
CPC ........ H02K 41/00–41/065; H02K 1/17; H02K 1/223; H02K 21/042; H02K 21/44
USPC ............. 310/13, 12.01, 181, 154.02
See application file for complete search history.

(56) References Cited

U.S. PATENT DOCUMENTS

| | | | | |
|---|---|---|---|---|
| 4,049,983 A * | 9/1977 | Attwood | ............. | H02K 41/025 104/290 |
| 4,246,504 A * | 1/1981 | Clifford | ................ | H02K 21/44 310/181 |
| 4,370,577 A * | 1/1983 | Wakabayashi | ......... | H02K 41/03 310/12.13 |
| 4,504,750 A * | 3/1985 | Onodera | ............. | H02K 41/033 310/12.05 |
| 4,755,703 A * | 7/1988 | Ueno | .................... | H02K 37/10 310/12.24 |
| 4,860,183 A * | 8/1989 | Maeda | ................ | G11B 5/5521 318/135 |

* cited by examiner

*Primary Examiner* — Thomas Truong
(74) *Attorney, Agent, or Firm* — Apogee Law Group P.C.; Francisco A. Rubio-Campos

(57) ABSTRACT

A transverse flux induction motor ("TFIM") is described in accordance with the present invention. The TFIM may be a linear induction motor or a rotary induction motor. The TFIM includes a primary motor element and secondary motor element. The primary motor element includes a plurality of coils and at least one magnetic element. The plurality of coils are arranged to generate a control flux along a first direction when power is applied to at least one coil of the plurality of coils and the at least one magnetic element is arranged to generate a bias flux in a second direction that is substantially transverse to the first direction. The secondary motor element is moveable in the first direction, relative to the primary motor element, in response to the control flux.

15 Claims, 8 Drawing Sheets

TRANSVERSE FLUX INDUCTION MOTOR WITH PASSIVE BRAKING SYSTEM

CROSS-REFERENCE TO RELATED APPLICATION

This application is a continuation-in-part ("CIP") of earlier filed U.S. patent application Ser. No. 12/751,823, titled "Induction Motors," filed on 31 Mar. 2010, to inventor Robert J. Atmur, which is herein incorporated by reference in its entirety.

BACKGROUND OF THE INVENTION

1. Field of the Invention

This present invention relates generally to electric motors, and more particularly, to induction motors.

2. Related Art

Electric motors are common place in modern society. An electric motor is an electric machine that converts electrical energy into mechanical energy. In normal motoring mode, most electric motors operate through the interaction between an electric motor's magnetic field and winding currents to generate force within the motor. In certain applications, such as in the transportation industry with traction motors, electric motors can operate in both motoring and generating or braking modes to also produce electrical energy from mechanical energy. Electric motors may be powered by direct current ("DC") sources, such as from batteries, motor vehicles or rectifiers, or by alternating current ("AC") sources, such as from the power grid, inverters or generators.

An AC electric motor is an electric motor driven by an AC source that commonly includes two basic parts, an outside stationary stator having coils supplied with alternating current to produce a rotating magnetic field, and an inside rotor attached to the output shaft that is given a torque by the rotating field. Generally, there are two main types of AC electric motors, depending on the type of rotor used. The first type is the induction motor (also known as an asynchronous motor which may be a rotary induction motor or linear induction motor) and the second type is the synchronous motor. Induction motors are typically simple to construct, robust, capable of providing very high forces, and rely on a small difference in speed between the rotating magnetic field and the rotor to induce rotor current. In contrast, the synchronous motor does not rely on induction and as a result, can rotate exactly at the supply frequency or a sub-multiple of the supply frequency; however, synchronous motors tend to be relatively complex, as compared to induction motors, due to control logic that is typically needed to maintain synchronization of the synchronous motors. Other types of electric motors also include eddy current motors, and AC/DC mechanically commutated machines in which speed is dependent on voltage and winding connection; however, this disclosure is limited to induction motors.

Generally, an induction motor is an AC electric motor where the electric current in the rotor needed to produce torque is induced by electromagnetic induction from the magnetic field of the stator winding. The rotor of a rotary induction motor may be either wound type or squirrel-cage type. Generally, three-phase squirrel-cage induction motors are widely used in industrial drives because they are rugged, reliable, and economical. Turning to the linear induction motor, the linear induction motor operates on the same general principles as a rotary induction motor; however, a linear induction motor is typically designed to produce straight line motion. Uses of linear induction motors include magnetic levitation, linear propulsion, linear actuators, and liquid metal pumping. As an example, linear induction motors have been utilized for magnetic levitation ("maglev") propulsion in public transportation systems such as high speed trains and other uses, such as, for example, direct X-Y motion for precision laser cutting, sliding doors, lifting mechanisms, etc.

Unfortunately, while induction motors are generally capable of producing high forces, under very high force conditions (such as, at maximum slip conditions), the operating current of an induction motor may be higher than the rated continuous current of the induction motor. This may lead to excessive heating and a limited duty cycle of the induction motor. As an example, under high slip conditions, an induction motor may operate at five times the normal rated continuous current which leads to excessive heating and a limited duty cycle that may be about 10 to 15 percent. Generally, known approaches to solve these problems include restricting the inertial loads and providing significant cooling to the linear induction motor. Unfortunately, this approach causes the induction motor to have slow acceleration, high cost, a requirement for precision mechanical assembly, difficulty in handling and manufacturing, loss of synchronization caused by control failures, and a significant cooling system. As such, there is a need to eliminate the large magnetized currents, improve efficiency, allow extended operation in maximum slip conditions, and allow high efficiency operation at very low speed and under high inertial loads.

An additional problem related to linear induction motors is remanence (also known as residual magnetic flux), which is a safety issue when power is lost to a linear induction motor during operation. As an example, if the linear induction motors are being utilized in the operation a maglev propulsion system (such as, for example a maglev train or heavy equipment), there is the possibility that a loss of power to the maglev propulsion system may case the train to lose magnetic levitation and potentially cause damage to the train and its content.

Approaches to solve this problem typically involve using permanent magnets in the induction motor to allow for the existence of a magnetic field even if there is a loss of power to the system. In a linear induction motor, this magnetic field would be capable of producing a breaking force against the linear motion of the maglev resulting in passive breaking that slows down the maglev and even passive holding (i.e., maintaining magnetic levitation) of the maglev.

Unfortunately, this approach requires the use of a large amount of permanent magnets. Permanent magnets are typically rare-earth magnets that are becoming scarcer and more expensive because of their increased applications in modern technology. In the case of a maglev train, the maglev propulsion system may include more than a hundred miles of track that may include a linear induction motor every 30 to 40 feet, where every linear induction motor includes numerous large rare-earth magnets. As a result, this system may include thousands of very expensive rare-earth magnets. Therefore, there is also a need for a system that utilizes less expensive magnetic materials that are capable of providing both passive breaking and passive holding of a linear induction motor.

SUMMARY

A transverse flux induction motor ("TFIM") is described in accordance with the present invention. The TFIM may be a linear induction motor or a rotary induction motor. The TFIM includes a primary motor element and secondary motor element. The primary motor element includes a plurality of coils and at least one magnetic element. The plurality of coils are arranged to generate a control flux along a first direction when power is applied to at least one coil of the plurality of coils and the at least one magnetic element is arranged to generate a bias flux in a second direction that is substantially transverse to the first direction. The secondary motor element is moveable in the first direction, relative to the primary motor element, in response to the control flux.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1A:
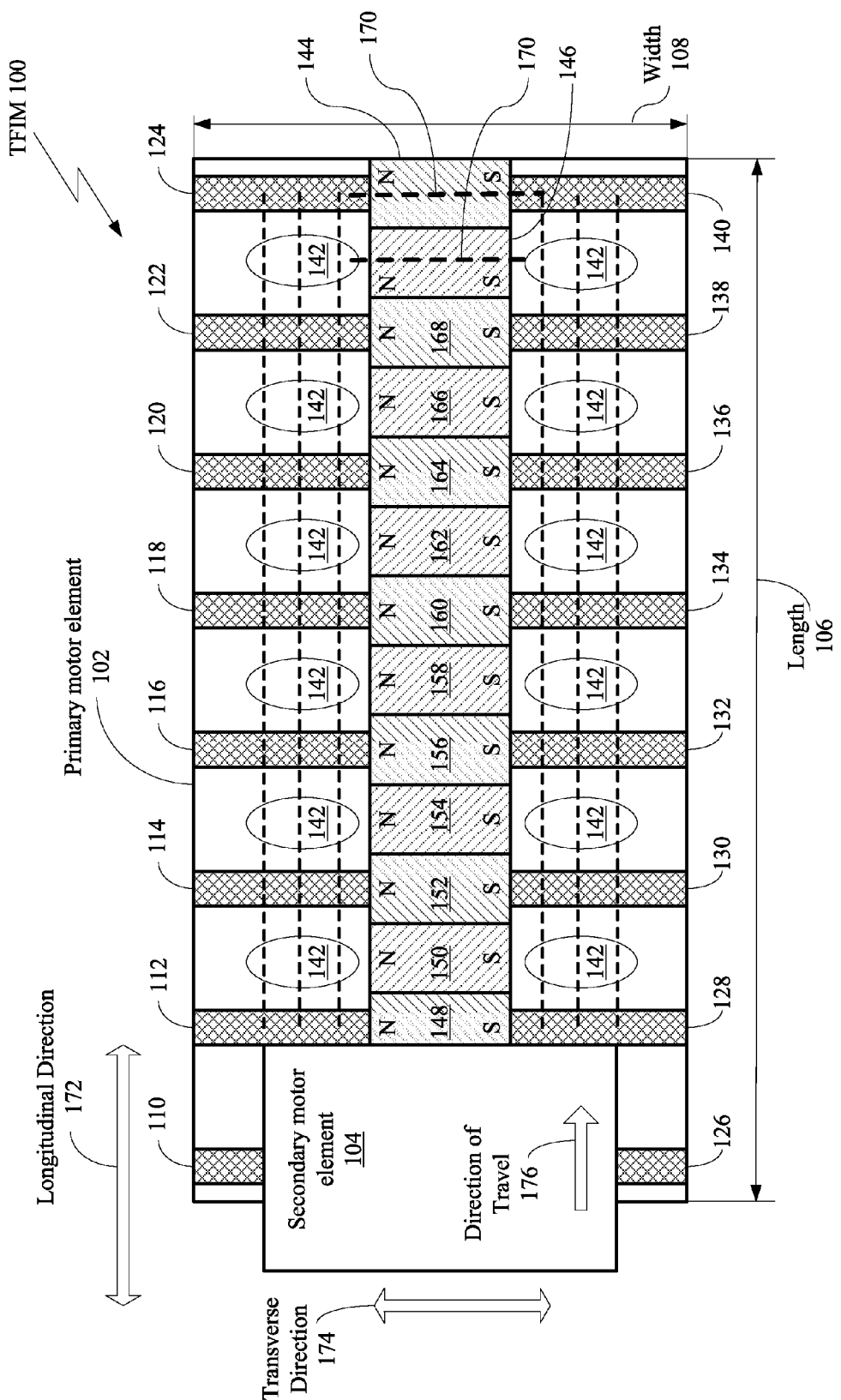
FIGS. 1A, 1B, and 1C are various schematic views of an example of an implementation of a transverse flux induction motor ("TFIM") in accordance with the present invention.

A transverse flux induction motor ("TFIM") is described in accordance with the present invention. The TFIM may be a linear induction motor or a rotary induction motor. The TFIM includes a primary motor element and secondary motor element. The primary motor element includes a plurality of coils and at least one magnetic element. The plurality of coils are arranged to generate a control flux along a first direction when power is applied to at least one coil of the plurality of coils and the at least one magnetic element is arranged to generate a bias flux in a second direction that is substantially transverse to the first direction. The secondary motor element is moveable in the first direction, relative to the primary motor element, in response to the control flux.

In the case that the TFIM is a rotary induction motor (also referred to herein as a transverse flux rotary induction motor ("TFRIM")), the primary motor element is a stator that is configured in a radial configuration, the secondary motor element is a rotor having an axis of rotation, and the first direction is around the axis of rotation of the rotor. Alternatively, in the case that the TFIM is a linear induction motor (also referred to herein as a transverse flux linear induction motor ("TFLIM")), the primary motor element has a linear configuration that is configured as a geometrically flat motor element having a length and a width where the first direction is along the length (i.e., longitudinal) of the primary motor element. The primary motor element may also be referred to as a stator which has been effectively "unrolled" so that instead of producing a torque (i.e., a rotation force), the stator produces a linear force along its length. The secondary motor element may include a non-magnetic reaction plate that is placed adjacent to the primary motor element and is also moveable in the first direction. The primary motor element and the secondary motor element may be arranged to form a dual core single-side linear induction motor.

The plurality of coils in the primary motor element may include a first coil, second coil, and third coil. The first coil may be configured to be powered by an alternating current having a first phase, the second coil may be configured to be powered by an alternating current having a second phase, and the third coil may be configured to be powered by an alternating current having a third phase. The first phase, second phase, and third phase may be separated from each other by approximately 120 degrees of phase.

The plurality of coils may also include two rows of coils spaced along the first direction where poles of the at least one magnetic element may be positioned between the two rows of coils. The at least one magnetic element may include a plurality of magnetic elements and the poles of two or more adjacent magnetic elements of the plurality of magnetic elements may be oriented in the same direction.

The at least one magnetic element may include a rare-earth permanent magnet with very high magnetic anisotropy (e.g., permanent magnets based on Samarium or Neodymium such as, for example, $SmCo_5$ or $Nd_2Fe_{14}B$), ferromagnetic materials that may be magnetically "hard" or "soft" material, or any low coercive strength high residual flux material ("LCSHRF material") capable of producing, when polarized, a transverse flux field within the primary motor element. It is appreciated that magnetically soft materials are materials that may be magnetized with a magnetic field but do not tend to stay magnetized once the magnetic field is removed, while magnetically hard materials are materials that do stay magnetized once the magnetic field is removed. Examples of magnetically soft materials include annealed iron, alloys of iron, nickel with compositions around $Ni_{80}Fe_{20}$, iron-silicon alloys, amorphous nanocrystalline alloys, nickel-iron alloys, and soft ferrites. Examples of magnetically hard materials include ALNiCo materials (i.e., a family of iron alloys that are composed primarily of iron, aluminum, nickel, and cobalt and may also include copper and sometimes titanium) and hard ferrites (e.g., compounds of iron oxide and barium, strontium carbonate, and cobalt such as, for example, strontium ferrite, barium ferrite, and cobalt ferrite). An example of a LCSHRF material may be H-13 annealed steel which is strong and inexpensive.

In the case of utilizing a LCSHRF material, the LCSHRF material may be enclosed within a solenoid coil. In operation when the solenoid coil is energized, the solenoid coil supports the transverse field with enough energy to maintain the polarization of the LCSHRF material under all load and environmental conditions of the TFIM. The solenoid is designed to provide the energy needed to the LCSHRF material for a given application of the TFIM. The solenoid surface current density (herein referred to simply as the current density of the solenoid) is directly proportional to the number of turns of the solenoid coil around the LCSHRF material (i.e., the core of the solenoid) multiplied by the amplitude of the current supplied to the solenoid coil. The solenoid energy is also directly proportional to the current density such that the solenoid provides this energy via the supplied current density that, in this case, is low enough to not adversely impact the LCSHRF material thermally and also not require external cooling of the solenoid and/or LCSHRF material other than by natural convection. As such, utilizing a solenoid in combination with the LCSHRF material acting as the core of the solenoid, as a magnetic element of the TFIM, allows the magnetic element to act as the transverse flux producing material with a low power support coil that maintains the LCSHRF material's residual flux against the environments and any flux changes in the solenoid that may be the result of, for example, a loss of power.

In an example of operation, multi-phase current may be applied to the coils of the primary motor element to generate a moving magnetic field. The moving magnetic field of the coils induces a current flow in the secondary motor element, which generates an induced magnetic field. Interaction of the moving magnetic field of the primary motor element and the induced magnetic field of the secondary motor element creates a force that can move the primary motor element or the secondary motor element depending on the specific configuration of the TFIM. The multi-phase current is usually, but not always, a three-phase alternating current and may be referred to as a control current.

It is appreciated by those skilled in the art that the mechanical power output of an induction motor may be related to a magnitude of the control current, among other things. Thus, at a given voltage, a larger control current may generate a higher output mechanical power of the induction motor. However, higher current may also lead to increased resistive losses from the coil, which generates heat. As the resistive losses increase they reduce the overall efficiency of the induction motor.

It is also appreciated that the heat generated due to these resistive losses may place operational limits on the induction motor due to the temperatures limits of the materials utilized in the induction motor and also the heat dissipation limits of the induction motor itself (i.e., how quickly the heat can be removed from the induction motor). To address the heat dissipation concerns (where high output power is desired), some induction motors may be operated at a decreased duty cycle. It is further appreciated that while a large control current may be applied in order to provide the desired torque or force produced by the induction motor, this control current may be applied intermittently rather than continuously, so as to allow for heat dissipation in the induction motor during the inactive periods. The percentage of time that the control current is applied may be referred to as the "duty cycle." Thus, as an example, a thirty-percent ("30%") duty cycle indicates that the control current is applied only thirty-percent of the time and no control current is applied during the remaining seventy-percent ("70%") of the time.

The TFIM, described herein, is an improved induction motor that enables increased power output of the TFIM without increasing the control current, thereby increasing the efficiency of the TFIM (as compared to known induction motors) for a given control current. This reduces the heat losses of the TFIM, which may enable an increased duty cycle of the TFIM as compared to known induction motors.

In an example of operation of the TFIM, the primary motor element is arranged to provide a longitudinal control flux. In general, a control flux refers to a magnetic flux generated by the control current applied to one or more coils of the plurality of coils. A longitudinal control flux refers to a control flux that is oriented along the first direction (which was described earlier), which corresponds to the direction of movement between the primary motor element and the secondary motor element. If the TFIM is a TFLIM having a length along which the secondary motor element moves relative to the primary motor element, the longitudinal control flux is oriented along the length of the TFLIM. If, instead, the TFIM is a TFRIM such as, for example, a squirrel cage motor, a portion of the rotor may rotate in a plane normal to an axis of the rotor and the longitudinal control flux may be oriented within the plane that is normal to the axis of the rotor.

The primary motor element may also include one or more magnetic elements. The magnetic elements are arranged to generate a bias flux that is substantially transverse to the longitudinal control flux. In a TFLIM, the bias flux may be oriented substantially transverse to the length along which the longitudinal control flux is oriented. Alternatively, in a TFRIM, the bias flux may be oriented along the axis of the rotor.

In this example, the one or more magnetic elements may be selected such that the magnitude of the bias flux is approximately equal to two times the magnitude of the peak of the control flux (e.g., the control flux at a magnetic saturation condition of the TFIM). In other worlds, unlike known induction motors, approximately one-half of the total flux of the TFIM may be provided by the bias flux. Therefore, the peak output of the TFIM may be achieved at one-half the control current that would be used by the same induction motor without the bias flux. Additionally, the coil losses in the TFIM may be reduced to approximately one-quarter of the coil losses produced by a known induction motor that does not utilize the bias flux produced in the TFIM because the coil losses are proportional to the square of the control current (i.e., using Ohm's law and the power equation, the coil loss (which is equal to the power "P" dissipated by the coil) is equal to the square of the control current ("I") multiplied by the coil resistance ("R"), which may be written as an power equation: $P=I^2R$).

Because the coil losses are reduced in the TFIM, the amount of heat that needs to be removed from the TFIM is also reduced. This enables the TFIM, which utilizes the transverse bias flux, to operate at a magnetic saturation condition (e.g., the maximum design control current) with a higher duty cycle than is possible with known induction motors because these known induction motors do not utilize a bias flux. As such, unlike known induction motors, the TFIM may be able to continuously operable at the magnetic saturation condition with a one-hundred percent ("100%") duty cycle.

As a further example of operation of the TFIM, the bias flux is repulsive to the secondary motor element (e.g., the reaction plate or rotor). This facilitates the levitation of the reaction plate in a TFLIM or the centering of the rotor in TFRIM. In a safety situation, if the power is lost during operation of a TFLIM, the bias flux acts to passively brake the motion of the reaction plate thereby stopping the movement of the reaction plate in a safe manner. If, for example, the TRLIM is utilized in a maglev train, the bias flux allows the maglev train to passively break and eventually safely stop.

Figure 1B:
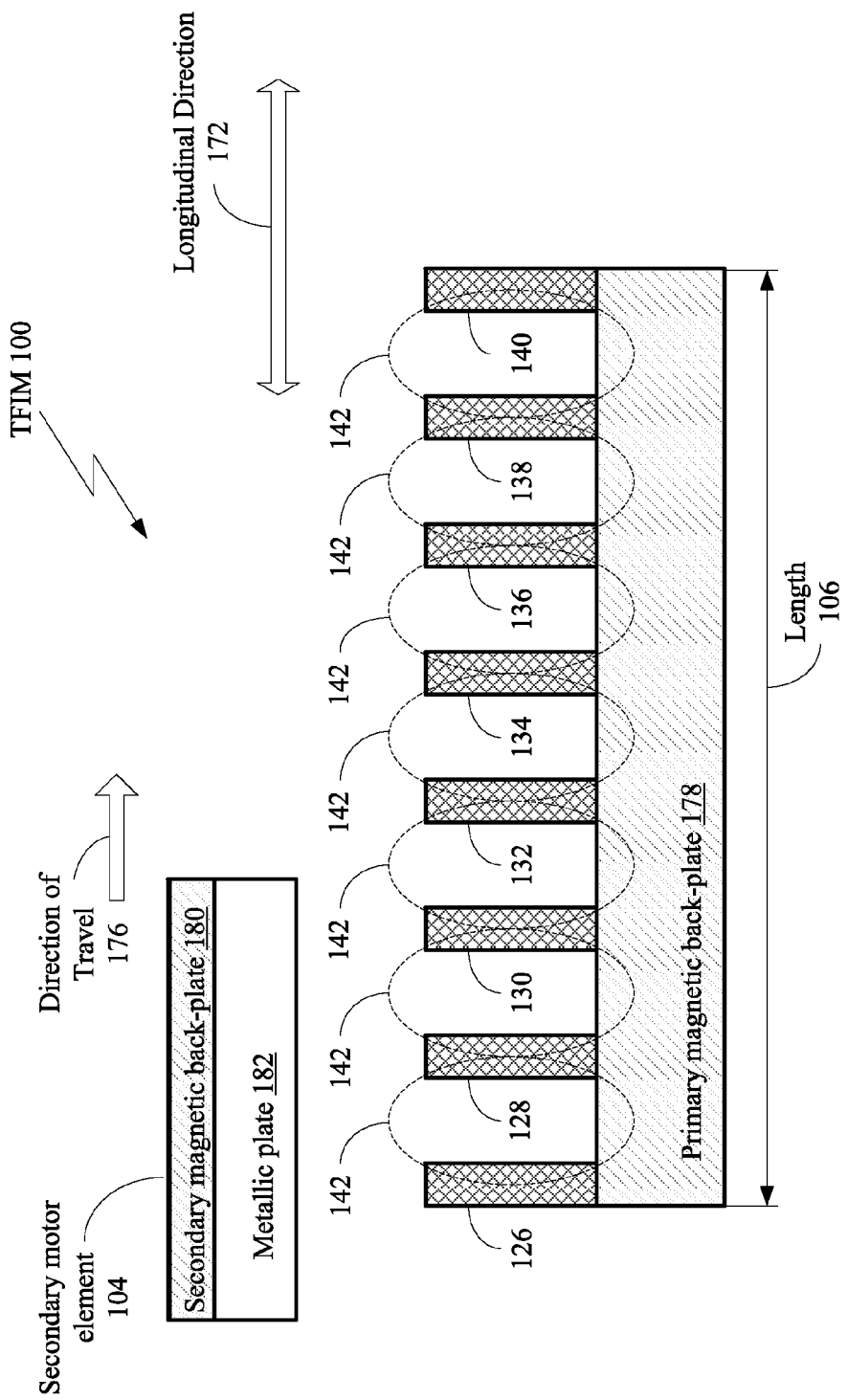
Figure 1C:
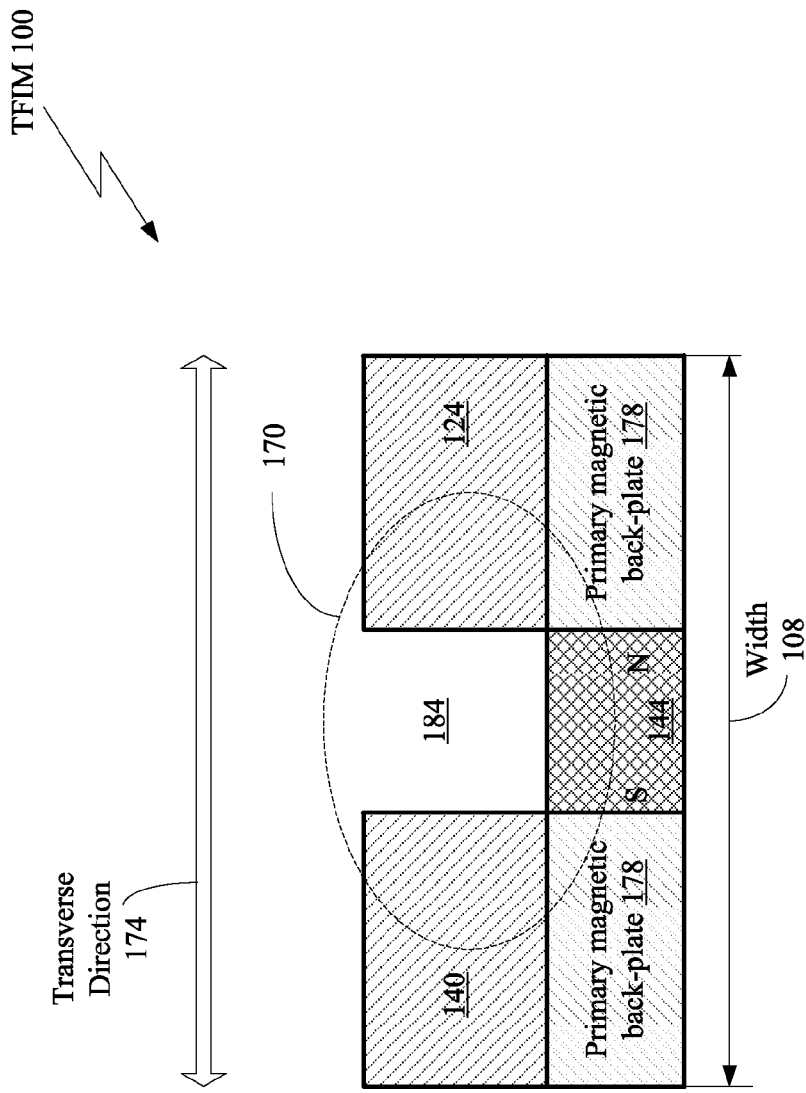

Turning to the figures, in FIGS. 1A, 1B, and 1C, various schematic views of an example of an implementation of a TFIM 100 is shown in accordance with the present invention. Specifically, FIG. 1 shows a schematic top view of an example of an implementation of the TFIM 100. In this example, the TFIM 100 is shown to be a TFLIM having a primary motor element 102 and a secondary motor element 104. In this example, the primary motor element 102 may be referred to as the stator (even though it is an unfolded stator as compared to a TFRIM) and the secondary motor element 104 is basically a rotor that has been unrolled and may be referred to as a reaction plate. The TFIM 100 has a length 106 and a width 108. Again, in this example, the TFIM 100 is illustrated as a TFLIM; however, the TFIM 100 could be a TFRIM as described further with reference to FIGS. 6A and 6B.

Turning back to FIGS. 1A, 1B, and 1C, in this example, the primary motor element 102 includes a plurality of coils 110, 112, 114, 116, 118, 120, 122, 124, 126, 128, 130, 132, 134, 136, 138, and 140 arranged along the length 106 of the TFIM 100 to generate a control flux 142 (between each pair of coils) when power is applied to at least one of the plurality of coils. The primary motor element 102 also includes one or more magnetic elements 144, 146, 148, 150, 152, 154, 156, 158, 160, 162, 164, 166, and 168 arranged along the length 106 in between the plurality of coils 110, 112, 114, 116, 118, 120, 122, 124, 126, 128, 130, 132, 134, 136, 138, and 140, such that the magnetic elements 144, 146, 148, 150, 152, 154, 156, 158, 160, 162, 164, 166, and 168 produce a bias flux 170 between the pairs of coils that are arranged adjacent to the corresponding magnetic elements. In this example, the coils 124, 112, 114, 116, 118, 120, and 122 are arranged adjacent to the north pole of magnetic elements 144, 148, 152, 156, 160, 164, and 168, respectively. Similarly, the coils 140, 128, 130, 132, 134, 136, and 138 are arranged adjacent to the south pole of magnetic elements 144, 148, 152, 156, 160, 164, and 168, respectively. As such, it is appreciated that the first magnetic element 144 and the second permanent magnet 146 are arranged to generate a bias flux 170 between the pair of coils 124 and 140.

The bias flux 170 may be substantially transverse to the control flux 142. For example, the control flux 142 may be oriented along a first direction (i.e., the longitudinal direction 172) along the length 106 of the TFIM 100 and the bias flux 170 may be oriented along a second direction (i.e., the transverse direction 174) along the width 108 of the TFIM 100, which is substantially transverse to the longitudinal direction 172. Since in this example, the TFIM 100 is a TFLIM, the control flux 142 may be oriented along the longitudinal direction 172 to generate movement of the secondary motor element 104 relative to the primary motor element 102 in a direction of travel 176 that is in the longitudinal direction 172. Since the bias flux 170 is substantially transverse to the control flux 142, the bias flux 170 is oriented along the transverse direction 174 that is generally perpendicular to the longitudinal direction 172.

As a further example, the primary motor element 102 and secondary motor element 104 of the TFIM 100 may be arranged to form a dual core, single-sided linear induction motor. In this example, the plurality of coils 110, 112, 116, 118, 120, 122, 124, 126, 128, 130, 132, 134, 136, 138, and 140 includes a first row of coils 110, 112, 114, 116, 118, 120, 122, and 124 and a second row of coils 126, 128, 130, 132, 134, 136, 138, and 140. Each of the rows of coils operate using multi-phase current. For example, when the multi-phase current is three-phase current, the first row of coils 110, 112, 114, 116, 118, 120, 122, and 124 may include a first A-phase coil 110, a first B-phase coil 112, and a first C-phase coil 114. Similarly, the second row of coils 126, 128, 130, 132, 134, 136, 138, and 140 may include a second A-phase coil 126, a second B-phase coil 128, and a second C-phase coil 130. Coils 110, 112, 114, 116, 118, 120, 122, and 124 of the first row of coils may be electrically connected with the corresponding coils 126, 128, 130, 132, 134, 136, 138, and 140 of the second row of coils. For example, the first A-phase coil 110 may be in electrically connected with the second A-phase coil 126, as described further with reference to FIG. 4. Additionally, the coils 110, 112, 114, 116, 118, 120, 122, and 124 of the first row of coils may be wound counter to the coils 126, 128, 130, 132, 134, 136, 138, and 140 of the second row of coils. For example, if the coils 110, 112, 114, 116, 118, 120, 122, and 124 of the first row of coils are wound counterclockwise, then the coils 126, 128, 130, 132, 134, 136, 138, and 140 of the second row of coils are wound clockwise. In this example, the flux generated by the corresponding coils may generate a force in the same direction on the secondary motor element 104.

As mentioned earlier, the one or more magnetic elements 148, 150, 152, 154, 156, 160, 162, 164, 166, 168, 146, and 144 may be arranged between the first row of coils 110, 112, 114, 116, 118, 120, 122, and 124 and the second row of coils 126, 128, 130, 132, 134, 136, 138, and 140. For example, the poles of the one or more magnetic elements 148, 150, 152, 154, 156, 160, 162, 164, 166, 168, 146, and 144 may be positioned between the two rows of coils as described earlier. In particular, the poles of adjacent magnetic elements may be oriented in the same direction. For example as shown in FIG. 1A, all the adjacent magnetic elements 148, 150, 152, 154, 156, 160, 162, 164, 166, 168, 146, and 144 have their respective north pole oriented toward the coils 110, 112, 114, 116, 118, 120, 122, and 124 of the first row of coils and their respective south pole oriented toward the coils 126, 128, 130, 132, 134, 136, 138, and 140 of the second row of coils. Alternatively, all the adjacent magnetic elements 148, 150, 152, 154, 156, 160, 162, 164, 166, 168, 146, and 144 have their respective south pole oriented toward the coils 110, 112, 114, 116, 118, 120, 122, and 124 of the first row of coils and their respective north pole oriented toward the coils 126, 128, 130, 132, 134, 136, 138, and 140 of the second row of coils. In either case, all of the magnetic elements are arranged with the same orientation, i.e., the corresponding poles of the magnetic elements are oriented toward a particular one of the rows of coils.

In this example, the secondary motor element 104 is moveable in the first direction 172 relative to the primary motor element 102 in response to the control flux 142. As mentioned earlier, the secondary motor element 104 may be moveable in the direction of travel 176 along the longitudinal direction 172. In this example of an implementation of the TFIM 100, the primary motor element 102 is stationary and the secondary motor element 104 is moveable. However, alternatively, in another example of an implementation of the TFIM 100, the primary motor element 102 is moveable and the secondary motor element 104 is stationary.

It is appreciated that for simplicity, the bias flux 170 is only shown across the two magnetic elements 144 and 146; however, it is appreciated that a bias flux 170 would exist across all the magnetic elements 144, 146, 148, 150, 152, 154, 156, 158, 160, 162, 164, 166, and 168 shown between the corresponding pairs of coils. Additionally, while only 16 coils 110, 112, 114, 116, 118, 120, 122, 124, 126, 128, 130, 132, 134, 136, 138, and 140 and 13 magnetic elements 144, 146, 148, 150, 152, 154, 156, 158, 160, 162, 164, 166, and 168 have been shown in FIG. 1A, it is appreciated that these numbers have been chosen solely for the purpose of illustration in FIGS. 1A, 1B, and 1C and is not a limitation as to the number of coils and magnetic elements that may be utilized in the TFIM 100. Generally, the total number of coils and magnetic elements will be determined by the length 106 of the TFIM 100.

Turning to FIG. 1B, a schematic side view of the TFIM 100, of FIG. 1A, is shown. In this side view, the coils 126, 128, 130, 132, 134, 136, 138, and 140 of the second row of coils is shown with the associated control flux 142 between adjacent coils. The TFIM 100 may include a primary magnetic back-plate 178 below the coils 110, 112, 114, 116, 118, 120, 122, 124, 126, 128, 130, 132, 134, 136, 138, and 140 to include the flux density of the control flux 142, the bias flux 170, or both. Additionally, in this example of an implementation of the TFIM 100 the secondary motor element 104 may also include a secondary magnetic back plate 180 and a metallic plate 182. Both the primary magnetic back-plate 178 and secondary magnetic back-plate 180 may include ferrite materials such as, for example, iron. Alternatively, in another example of an implementation of the TFIM 100, the secondary motor element 104 does not include any magnetic back plate 180 and may, instead, be formed of conductive, non-magnetic material, such as, for example, aluminum or copper. In this example, when power is applied to the plurality of coils 110, 112, 114, 116, 118, 120, 122, 124, 126, 128, 130, 132, 134, 136, 138, and 140, eddy currents are induced in the secondary motor element 104 by the control flux 142. However, after the secondary motor element 104 is in motion, if the power applied to the plurality of coils 110, 112, 114, 116, 118, 120, 122, 124, 126, 128, 130, 132, 134, 136, 138, and 140 is cut off (e.g., due to a power failure), the bias flux 170 provides passive braking to slow down the motion of the secondary motor element 104.

In FIG. 1C, a schematic front view of the TFIM 100, of FIGS. 1A and 1B, is shown. In this front view, the coils 124 and 140 are shown with the associated bias flux 170. The magnetic element 144 is shown being adjacent and below the two coils 124 and 140 within the primary magnetic back-plate 178. An air gap 184 is shown between the two coils 124 and 140 and above the magnetic element 144.

As discussed earlier, the magnetic elements 144, 146, 148, 150, 152, 154, 156, 158, 160, 162, 164, 166, and 168 may include a rare-earth permanent magnet with very high magnetic anisotropy, ferromagnetic materials that may be magnetically hard or soft material, or any LCSHRF material capable of producing, when polarized, a transverse flux field within the primary motor element. Again, in the case of utilizing a LCSHRF material, the LCSHRF material may be enclosed within a solenoid coil as shown in FIG. 2.

Figure 2:
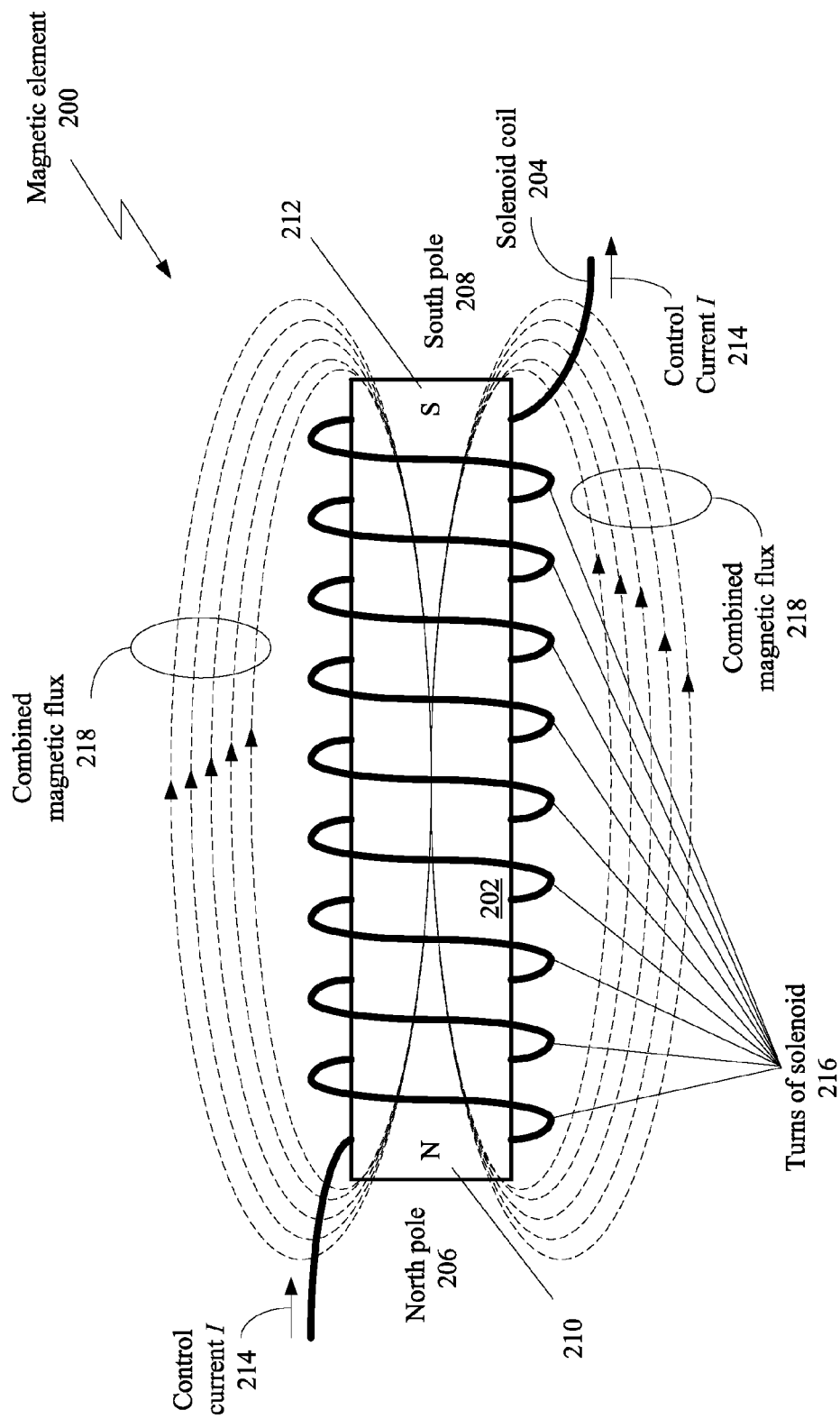
FIG. 2 is a schematic assembly view of an example of an implementation of a magnetic element that may be utilized with the TFIM shown in FIGS. 1A, 1B, and 1C in accordance with the present invention.

FIG. 2 is a schematic assembly view of an example of an implementation of a magnetic element 200 that may be utilized with the TFIM 100 shown in FIGS. 1A, 1B, and 1C in accordance with the present invention. The magnetic element 200 may include a LCSHRF material 202 that is wrapped in a solenoid coil 204. The magnetic element 200 will include a north pole 206 and south pole 208 that correspond to the north pole 210 and south pole 212 of the LCSHRF material 202. The solenoid coil 204 may be driven by a control current 214 ("1"), which when combined with the number of turns 216 ("N") of the coil 204 defines the current density (e.g., equal to N times 1) of the solenoid coil 204. In this example, the LCSHRF material 202 acts as the core of the solenoid coil 204. The combination of the LCSHRF material 202 and solenoid coil 204 produce a combined magnetic flux 218 that corresponds to the bias flux 170 in FIGS. 1A, 1B, and 1C. The combined magnetic flux 218 is the combination of LCSHRF material 202 magnetic flux (also referred to as "core residual flux," which is not shown in the FIG. 2) and the solenoid coil 204 magnetic flux (not shown). When the power is off and there is no control current 214, the solenoid coil 204 does not produce a magnetic flux and, as such, the combined magnetic flux 218 is equal to only the LCSHRF material 202 magnetic flux. When the power is on and there is a control current 214 that drives the solenoid coil 204, the control current 214 causes the solenoid coil 204 to induce a solenoid coil 204 magnetic flux that combines with the LCSHRF material 202 magnetic flux to produce the combined magnetic flux 218.

In operation, the solenoid coil 204 magnetic flux acts to maintain the magnetization of the LCSHRF material 202 allowing the LCSHRF material 202 to be a soft magnetized material. In this example, the control current 214 and number of turns 216 may be selected so as to maintain the magnetic polarization of the LCSHRF material 202 under all load and environmental conditions, e.g., the magnetic element 200 may be designed such that the number of turns 216 and the control current 214 drawn are capable of producing a current density of the solenoid coil 204 low enough to not impact the LCSHRF material 202 thermally and would only require cooling the magnetic element 200 via natural convection. The LCSHRF material 202 may be chosen to be any material capable of having a core residual flux strong enough to operate as bias flux 170 and also capable of retaining the core residual flux with the solenoid coil 204. It is appreciated that in the case of a power outage, the core residual flux of the LCSHRF material 202 would allow the magnetic element 200 to continue to produce a bias flux 170 that is strong enough to produce passive braking for the TFIM 100.

Figure 3:
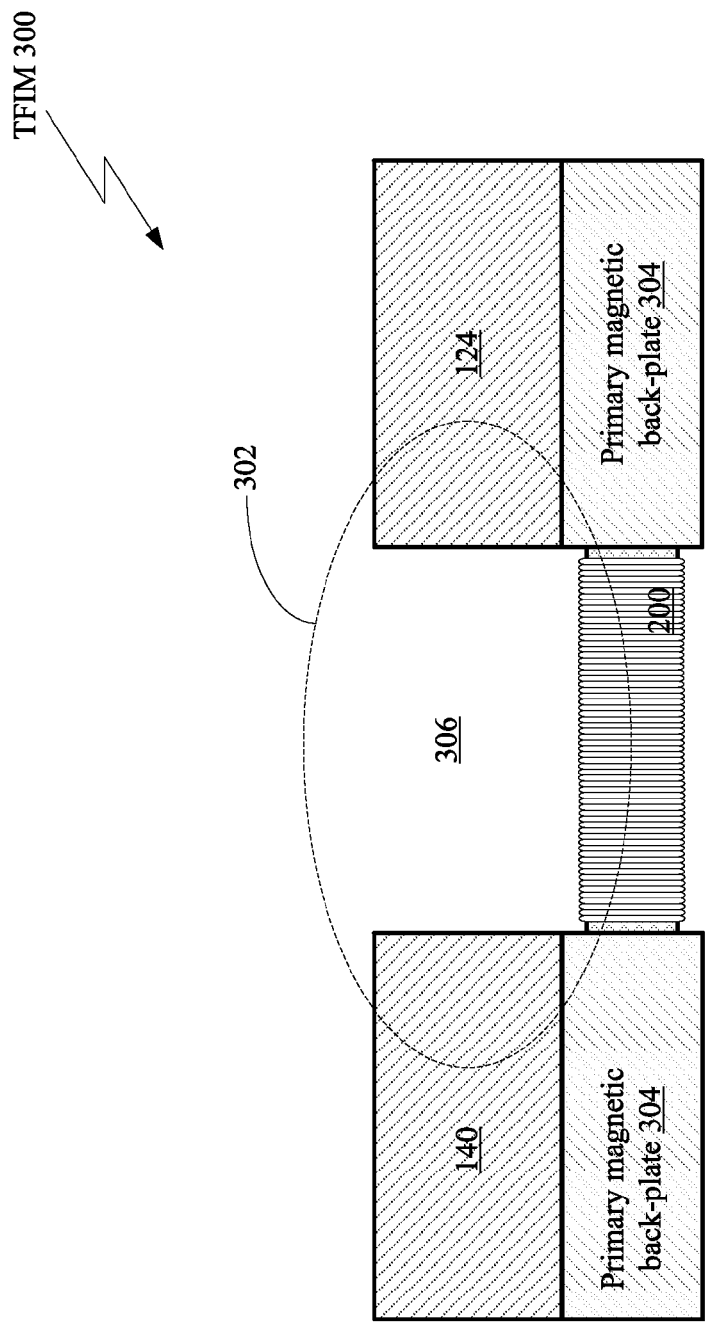
FIG. 3 is a schematic front view of the TFIM of FIG. 1 utilizing the magnetic element shown in FIG. 2 in accordance with the present invention.

In FIG. 3, a schematic front view of the TFIM 300 (similar to the TFIM 100 shown in FIGS. 1A and 1B) is shown utilizing the magnetic element 200 shown in FIG. 2 in accordance with the present invention. In this front view, the coils 124 and 140 are shown with the associated bias flux 302. The magnetic element 200 is shown being adjacent and below the two coils 124 and 140 within the primary magnetic back-plate 304. An air gap 306 is shown between the two coils 124 and 140 and above the magnetic element 200. As described in FIG. 2, the magnetic element 200 is a combination of the LCSHRF material 202 and solenoid coil 204. In this example, all the magnetic elements (not shown) of the TFIM 300 may be each a combination of a LCSHRF material and solenoid coil.

It is appreciated that a solenoid is defined as a coil wound into a tightly packed helix (i.e., helical coil) that may or may not have a core. Additionally, typical manufactured solenoids have some form of housing, encapsulate, and/or surface material that holds the solenoid coils in place typically in the form of a cylindrical or rectangular tube. In this disclosure, the solenoid coil 204 may also be simply referred to as solenoid 204 without any intended loss of generality. Additionally, while the solenoid 204 is not shown to have any housing, encapsulate, and/or surface material, this is for simplicity and it is appreciated that the solenoid 204 may be combined with any of these materials.

Figure 4:
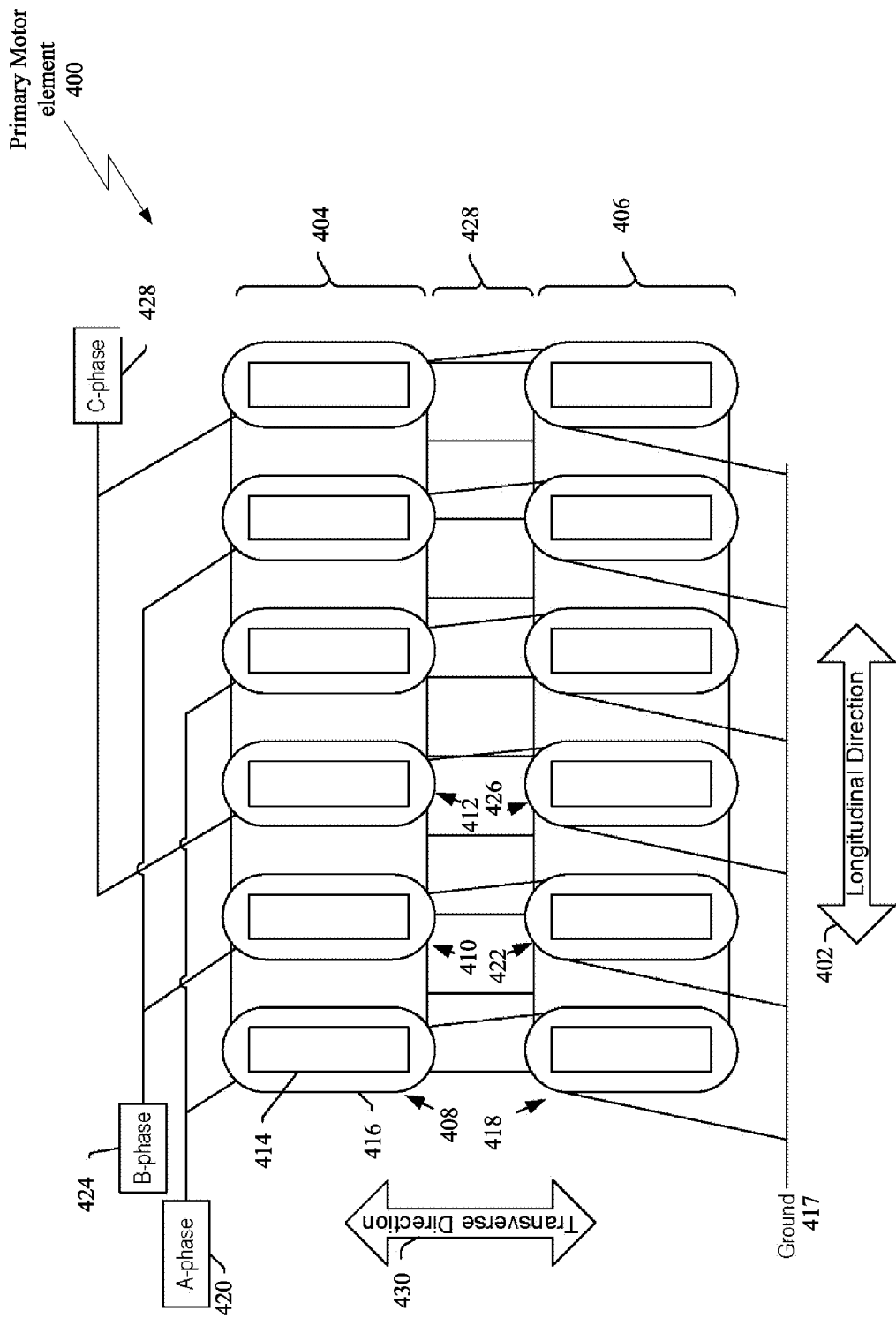
FIG. 4 is a schematic top view of another example of an implementation of a TFIM in accordance with the present invention.

FIG. 4 is a schematic top view of another example of an implementation of a TFIM in accordance with the present invention. In FIG. 4, the secondary motor element has been omitted to show more detail of the wiring of a primary motor element 400. The primary motor element 400 is illustrated as a primary of a TFLIM; however, the primary motor element 400 could also be a stator of a TFRIM as described below.

The primary motor element 400 includes a plurality of coils arranged to generate a control flux, such as the control flux 142 (shown in FIGS. 1A and 1B) or the control flux 616 of FIG. 6, along a longitudinal direction 402 when a three-phase alternating current is applied to the plurality of coils 404 and 406. For example, the plurality of coils 404 and 406 may include a first coil 408 configured to be powered by an alternating current having a first phase, second coil 410 configured to be powered by an alternating current having a second phase, and third coil 412 configured to be powered by an alternating current having a third phase. The first phase, the second phase, and the third phase may be separated from each other by approximately 120 degrees. In other examples, the multi-phase current could include more than, or fewer than, three phases. In such examples, the primary motor element 400 may include coils along the longitudinal direction 402 and each of the coils is wired to receive current of a particular phase of the multi-phase current.

In this example, the plurality of coils 404 and 406 includes the first row of coils 404 and the second row of coils 406 spaced along a first direction (e.g., the longitudinal direction 402). Each of the coils may include a core 414 and a winding 416. The coils of the first row of coils 404 may be electrically connected to the corresponding coils of the second row of coils 406 and the coils of the second row of coils 406 may be electrically connected to ground 417. For example, the first coil 408 may be electrically connected to a first corresponding coil 418 to form an A-phase set of coils coupled to an A-phase 420 of the three-phase alternating current. Also, the second coil 410 may be electrically connected to a second corresponding coil 422 to form a B-phase set of coils coupled to a B-phase 424 of the three-phase alternating current. Similarly, the third coil 412 may be electrically connected to a third corresponding coil 426 to form a C-phase set of coils coupled to a C-phase 428 of the three-phase alternating current.

The coils of the first row of coils 404 may be wound counter to the coils of the second row of coils 406. As an example, the windings 416 of the first row of coils 404 are counterclockwise and the windings 416 of the second row of coils 406 are clockwise. In another example, the windings 416 of the first row of coils 404 are clockwise and the windings 416 of the second row of coils 406 are counter clockwise. In either of these examples, the control flux generated by a set of coils coupled to a particular phase of the three-phase current may generate a force in the same direction on the secondary motor element.

The primary motor element 400 also includes one or more magnetic elements 428 arranged to generate a bias flux, such as the bias flux 170 (shown in FIGS. 1A and 1C) or the bias flux 622 of FIG. 6, along a transverse direction 430. In this example, as before, the transverse direction 430 may be substantially perpendicular to the longitudinal direction 402. As before, each of the one or more magnetic elements 428 may be arranged with the same pole orientation. For example, the poles of an adjacent magnetic element of the one or more magnetic elements 428 may each be oriented in the same direction. To illustrate, north poles of each of the one or more magnetic elements 428 may be oriented toward the first row of coils 404. Alternately, each of the north poles of the one or more magnetic elements 428 may be oriented toward the second row of coils 406.

Figure 5:
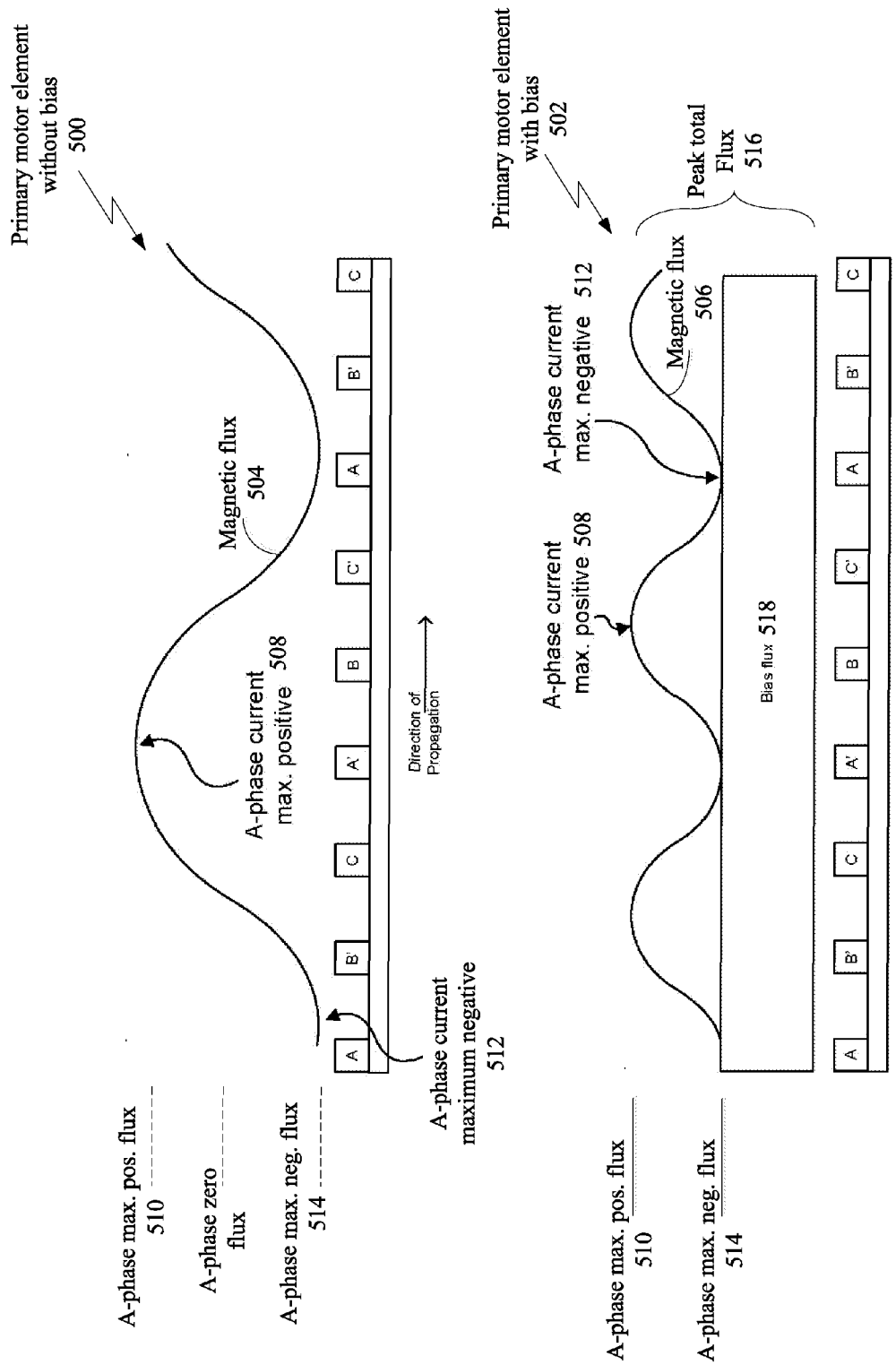
FIG. 5 is a diagram illustrating the magnetic flux of a first primary motor element without a transverse bias flux and a second primary motor element with a transverse bias flux, according to the present invention.

FIG. 5 is a diagram illustrating the magnetic flux of a first primary motor element 500 without a transverse bias flux and a second primary motor element 502 with a transverse bias flux, according to the present invention. The first primary motor element 500 and the second motor element 502 are considered to be similar for purposes of this description with the exception that the second primary motor element 502 has magnetic elements arranged to provide the transverse bias flux. Above each primary motor element 500 and 502 is an illustration of magnetic flux (504 and 506, respectively) associated with an A-phase of a multi-phase current applied to the respective primary motor element. Since the multi-phase current is alternating current, the magnetic flux generated by the coils of the primaries motor elements 500 and 502 is illustrated as a sine wave. When the A-phase current is at a maximum positive value 508, the control flux generated by the primary motor elements 500 and 502 is at a maximum positive flux 510. When the A-phase current is at a maximum negative value 512, the control flux generated by the primary motor elements 500 and 502 is at a maximum negative flux 514.

For the first primary motor element 500, a peak total flux refers to a difference between the maximum positive flux 510 and the maximum negative flux 514. For the second primary motor element 502, the peak total flux 516 refers to the maximum positive flux plus the bias flux 518. The magnitude of the bias flux is approximately equal to a magnitude of the control flux at a magnetic saturation condition of the TFIM. In this example, the second primary motor element 502 may achieve the same peak total flux at one half the control current input since the bias flux introduces permanent flux into the TFIM. Since coils of the first primary motor element 500 and the second primary motor element 502 are the same, the resistance of the coils is the same, and applying one half the control current leads to reduction of the heat load for the coils of the second primary motor element 502 to one quarter the heat load of the coils of the first primary motor element 500. Accordingly, losses of the second primary motor element 502 are reduced and a duty cycle of the second primary motor element 502 can be increased relative to a duty cycle of the first primary motor element 500 without a need for additional cooling capacity.

Figures 6A, 6B:
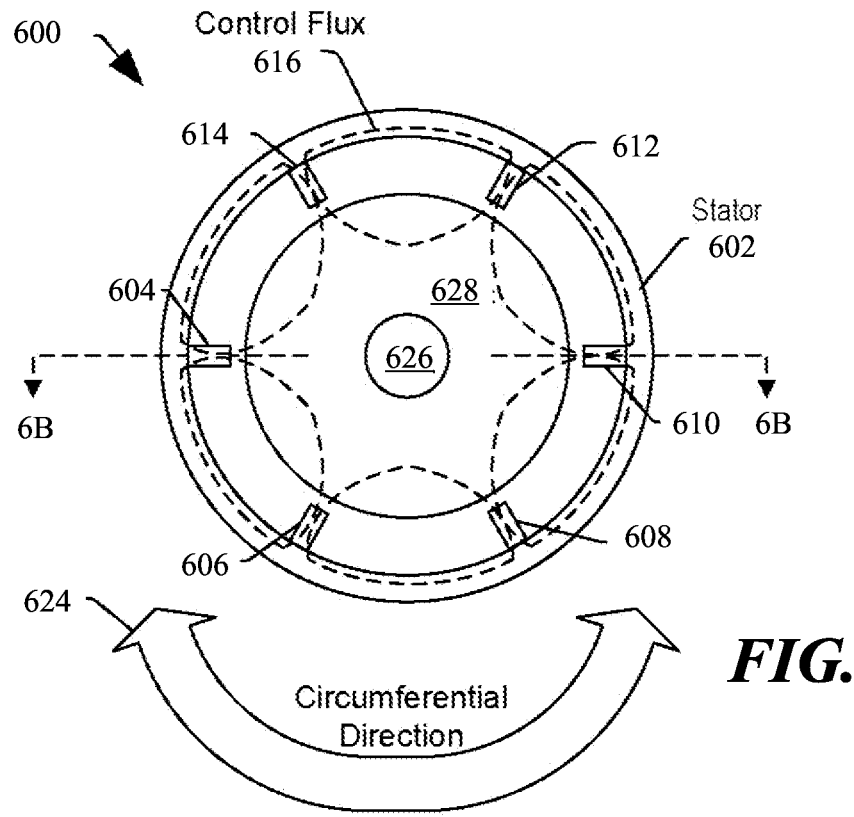
FIGS. 6A and 6B are a schematic cut away view and sectional view, respectively, of an example of an implementation a TFRIM in accordance with the present invention.

FIGS. 6A and 6B are a schematic cut away view and sectional view, respectively, of an example of an implementation a TFRIM 600 in accordance with the present invention. In the TFRIM 600, a primary motor element (also called a stator 602) has a radial configuration. For purposes of illustration, the stator 602 may be considered to be the primary motor element 102 of FIG. 1A bent into a circular configuration.

In this example, the stator 602 has a plurality of coils 604, 606, 608, 610, 612, and 614 arranged about a circumference of the stator 602 to generate control flux 616 when power is applied to the one or more of the plurality of coils 604, 606, 608, 610, 612, and 614. The stator 602 also includes one or more magnetic elements 618 and 620 arranged to generate a bias flux 622. The bias flux 622 may be substantially transverse to the control flux 616. For example, the control flux 616 may be oriented along a first direction and the bias flux 622 may be oriented along a second direction that is substantially transverse to the first direction. To illustrate, the TFRIM 600 may be described as have a circumferential direction 624. In this example, the circumferential direction 624 refers to a direction in a plane that is normal to an axis 626 of the TFRIM 600. In another example, the circumferential direction 624 refers to a same plane or a substantially parallel plane to a plane of rotation of a rotor 628 of the TFRIM 600. The control flux 616 may be oriented about the circumferential direction 624 to generate movement of the rotor 628 relative to the stator 602. The bias flux 622 may be oriented along a substantially transverse direction 625 that is generally perpendicular to the circumferential direction 624. For example, planes of the bias flux 622 may be parallel or substantially parallel to the axis 626 of the rotor 628.

In this example, the stator 602 includes a first row of coils and a second row of coils. Each coil of the second row of coils may correspond to a coil of the first row of coils. The second row of coils may be displaced from the first row of coils along the axis 626. For example, a first coil 604 of the first row of coils may correspond to a second coil 630 of the second row of coils, and a third coil 610 of the first row of coils may correspond to a fourth coil 632 of the second row of coils. The coils operate using multi-phase current to generate the control flux 616. For example, the first coil 604 and the third coil 610 may be coupled to an A-phase of the multi-phase current, a fifth coil 606 and a sixth coil 612 may be coupled to a B-phase of the multi-phase current, and a seventh coil 608 and an eighth coil 614 may be coupled to a C-phase of the multi-phase current. Corresponding coils of the second row of coils may be coupled to the same phase as the coils of the first row of coils. For example, when the first coil 604 is coupled to the A-phase, the second coil 630 may also be coupled to the A-phase. The coils of the first row of coils may be wound counter to the corresponding coils of the second row of coils. For example, the coils of the first row may be wound counterclockwise and the coils of the second row may be wound clockwise, or vice versa.

In this example, the one or more magnetic elements 618 and 620 are arranged between the first row of coils and the second row of coils. For example, poles of the one or more magnetic elements 618 and 620 may be positioned between the two rows of coils. In a particular embodiment, the poles of adjacent magnetic elements are oriented in the same direction. For example, corresponding poles of the magnetic elements 618 and 620 may be oriented toward a particular one of the rows of coils. The magnetic elements 618 and 620 may be selected so that a magnitude of the bias flux 622 is approximately equal to a magnitude of the control flux 616 at a magnetic saturation condition of the TFRIM 600. As described earlier, the magnetic elements 618 and 620 may be rare-earth permanent magnets, ferromagnetic materials that may be magnetically "hard" or "soft" material, or any LCSHRF material.

The rotor 628 is moveable in the circumferential direction 624 relative to the stator 602 in response to the control flux 616. For example, the rotor 628 may rotate about the axis 626 in response to the control flux 616. The bias flux 622 may act to center the rotor 628 relative to the stator 602.

It is appreciated that certain traditional linear motors used in transportation systems (e.g., high speed trains) operate at least part of the time in high force conditions (e.g., high slip conditions). During these high force conditions, an amount of control current applied to these linear motors may be significantly higher than a rated continuous current of the linear motors (e.g., about 5 times the rated continuous current). Limited duty cycles may be used to address overheating concerns with these linear motors. Additionally, the transportation systems may use magnetic levitation to reduce loads experienced by these linear motors.

The transverse flux bias of the TFIM described herein, in combination with the longitudinal control flux, enables operation of these TFIM with improved efficiency in high slip conditions, making them suitable for use in transportation systems. Additionally, the reduced heat load experienced by the TFIM described herein can enable continuous operation (e.g., 100% duty cycle) in maximum slip conditions, which may enable the transport of high inertia loads on standard rolling stock (e.g., wheeled railcars) reducing or eliminating the need for magnetic levitation. Further, the transverse flux bias of the TFIM described herein provides passive braking when no control current is applied, providing added safety in the event of a power failure.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A transverse flux induction motor ("TFIM"), the TFIM comprising:
    a primary motor element, wherein the primary motor element includes
        a first plurality of coils arranged in a first row in parallel with a second plurality of coils arranged in a second row, with each of the first plurality of coils connected to and disposed opposite a corresponding one of the second plurality of coils, and
        at least one magnetic element arranged and extending between the first row of coils and the second row of coils, the at least one magnetic element having a north pole adjacent the first row of coils and a south pole adjacent the second row of coils, and
    a secondary motor element,
    wherein the plurality of coils is arranged to generate a control flux along a first direction when power in the form of an alternating current ("AC current") is applied to at least one coil of the plurality of coils,
    wherein the secondary motor element is moveable in the first direction, relative to the primary motor element, due to induction in response to the control flux,
    wherein the at least one magnetic element is arranged to generate a bias flux in a second direction that is substantially transverse to the first direction, and,
    wherein the magnetic element is made of a material capable of maintaining the bias flux during a power outage sufficient for the bias flux to enable passive braking of the secondary motor element.

2. The TFIM of claim 1,
    wherein the primary motor element has a linear configuration having a length and a width, and
    wherein the first direction is longitudinal along the length of the primary motor element.

3. The TFIM of claim 2, wherein the secondary motor element includes a non-magnetic reaction plate.

4. The TFIM of claim 1, wherein the plurality of coils includes
    a first coil,
    a second coil,
    a third coil,
    wherein the first coil is configured to be powered by an alternating current having a first phase,
    wherein the second coil is configured to be powered by an alternating current having a second phase, and
    wherein the third coil is configured to be powered by an alternating current having a third phase,
    wherein the first phase, second phase, and third phase are separated from each other by approximately 120 degrees.

5. The TFIM of claim 1, wherein the plurality of coils includes two rows of coils spaced along the first direction.

6. The TFIM of claim 5, wherein poles of the at least one magnetic element are positioned between the two rows of coils.

7. The TFIM of claim 6, wherein the at least one magnetic element includes a plurality of magnetic elements, and wherein poles of two or more adjacent magnetic elements of the plurality of magnetic elements are oriented in a same direction.

8. The TFIM of claim 1, wherein the primary motor element and the secondary motor element are arranged to form a dual core single-sided linear induction motor.

9. The TFIM of claim 1, wherein the induction motor is continuously operable in a magnetic saturation condition and at a one hundred percent duty cycle.

10. The TFIM of claim 1, wherein a magnitude of the bias flux is approximately equal to two times the magnitude of the control flux at a magnetic saturation condition of the induction motor.

11. The TFLIM of claim 1 where each of the at least one magnetic element is wrapped in a solenoid coil configured to be driven by a control current and where each of the at least one magnetic element is made of a low coercive strength high residual flux material.

12. The TFLIM of claim 1 where each of the at least one magnetic element is selected from a group consisting of rare-earth permanent magnets, magnets comprising a ferromagnetic material, and magnets comprising a low coercive strength high residual flux material.

13. A transverse flux linear induction motor ("TFLIM"), the TFLIM comprising:
 a primary motor element having:
  a plurality of coils arranged in two rows of coils in a longitudinal direction, where each coil in a first row of coils is connected to and disposed opposite a corresponding coil in a second row of coils, wherein the plurality of coils are configured to generate a longitudinal control flux when multi-phase alternating current ("AC current") is applied to the plurality of coils;
 at least one magnetic element arranged between the two rows of coils, wherein the at least one magnetic element extends between the first row and second row of coils, the at least one magnetic element having a north pole adjacent the first row of coils and a south pole adjacent the second row of coils to generate a bias flux that is substantially transverse to the longitudinal control flux; and
 a solenoid coil wrapped around the at least one magnetic element and driven by a control current, and
 a reaction plate, wherein at least one of the reaction plate and the primary motor element is moveable in the longitudinal direction due to induction in response to the control flux, and
 wherein the magnetic element is made of a low coercive strength high residual flux material.

14. The TFLIM of claim 13, wherein the reaction plate is conductive and non-magnetic.

15. The TFLIM of claim 13, wherein, when the multi-phase current ceases to be applied to the plurality of coils while the reaction plate is in motion and the solenoid coil is driven by the control current, a solenoid coil magnetic flux provides passive braking to slow the motion of the reaction plate.

* * * * *